United States Patent
Irie et al.

(10) Patent No.: US 7,201,941 B2
(45) Date of Patent: Apr. 10, 2007

(54) PROCESS FOR PRODUCTION OF SURFACE-TREATED PARTICULATE WATER-ABSORBENT RESIN

(75) Inventors: Yoshio Irie, Himeji (JP); Takaaki Kawano, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 256 days.

(21) Appl. No.: 10/918,507

(22) Filed: Aug. 16, 2004

(65) Prior Publication Data

US 2005/0048221 A1    Mar. 3, 2005

(30) Foreign Application Priority Data

Aug. 27, 2003    (JP)    ............................. 2003-303306

(51) Int. Cl.
  *B05D 7/00*    (2006.01)
  *C08F 2/46*    (2006.01)

(52) U.S. Cl. ...................... 427/222; 427/212; 427/213; 427/496; 427/508; 428/402; 428/403; 428/407; 522/84; 522/86; 522/85; 522/104; 522/107; 522/113; 522/114; 522/119; 522/120; 522/121; 522/150; 522/151; 522/152; 522/153

(58) Field of Classification Search ................. 522/84, 522/85, 86, 104, 107, 113, 114, 119, 120, 522/121, 150, 151, 152, 153; 427/212, 213, 427/222, 496, 508; 428/402, 403, 407

See application file for complete search history.

(56) References Cited

U.S. PATENT DOCUMENTS

| 4,588,639 A | 5/1986 | Ozono |
| 5,385,983 A | 1/1995 | Graham |
| 5,445,284 A * | 8/1995 | Guest .......................... 215/252 |
| 2005/0031872 A1 * | 2/2005 | Schmidt et al. ............. 428/403 |

FOREIGN PATENT DOCUMENTS

| JP | 57-44627 | 3/1982 |
| JP | 2530668 | 6/1996 |

* cited by examiner

*Primary Examiner*—Sanza L. McClendon
(74) *Attorney, Agent, or Firm*—Roylance, Abrams, Berd & Goodman, L.L.P.

(57) ABSTRACT

An object of the present invention is to provide an excellent process for production of a surface-treated particulate water-absorbent resin wherein the process adopts a surface-treatment process that can enhance the properties (which the water-absorbent resin is desired to have) to extremely high levels, and also can solve the prior problems in such as safety, and further can sufficiently carry out the treatment even at a reaction temperature near room temperature. As a means of achieving this object, the process according to the present invention for production of a surface-treated particulate water-absorbent resin is characterized by comprising the steps of: adding a treating liquid to a particulate water-absorbent resin as a base polymer, wherein the treating liquid contains a radically polymerizable compound; and then irradiating the particulate water-absorbent resin with active energy rays while fluidizing the particulate water-absorbent resin, thereby surface-treating it.

10 Claims, No Drawings

PROCESS FOR PRODUCTION OF SURFACE-TREATED PARTICULATE WATER-ABSORBENT RESIN

BACKGROUND OF THE INVENTION

A. Technical Field

The present invention relates to a process for production of a particulate water-absorbent resin. Specifically, the present invention relates to a process for production of a particulate water-absorbent resin having been surface-treated by a specific surface-treatment process.

B. Background Art

Since the past, a water-absorbent resin is used as one of component materials of sanitary napkins, disposable diapers, or other sanitary materials which absorb body fluids. Known examples of such a water-absorbent resin include: hydrolyzed graft polymers of starch-acrylonitrile; neutralized graft polymers of starch-acrylic acid; saponified copolymers of vinyl acetate-acrylic acid esters; hydrolyzed copolymers of acrylonitrile or acrylamide, or crosslinked polymers of these hydrolyzed copolymers; and partially-neutralized and crosslinked poly(acrylic acids).

Examples of properties, which the water-absorbent resin is desired to have, include high absorption capacity, excellent absorption rate, high gel strength, and excellent suction force to suck up water from base materials. However, the relations between these properties do not necessarily show positive correlations. Particularly, the absorption capacity has contrary relations with such as the absorption rate, gel strength, and suction force. For example, if the absorption capacity is enhanced, then, when contacting with liquids, the water-absorbent resin unfavorably forms what are called "fisheyes" to thus hinder water from diffusing throughout the entire water-absorbent resin particles, with the unfavorable result that such as the absorption rate is extremely lowered.

As a process to prevent such a phenomenon to thus obtain a water-absorbent resin which exhibits a high absorption capacity and is comparatively good also in such as the absorption rate, for example, there is known a process in which surfaces of water-absorbent resin particles are coated with surfactants and/or nonvolatile hydrocarbons. However, as to this process, the dispersibility of water being initially absorbed may be improved, but no sufficient effects are obtained in point of the enhancement of the absorption rate and suction force of individual particles.

There are known processes in which surfaces of water-absorbent resins are treated with certain specific crosslinking agents to thereby enhance the crosslinking density of surface portions of the water-absorbent resins (e.g. refer to patent document 1 below).

Examples of the crosslinking agents used in these processes include polyhydric alcohols, polyglycidyl ethers, haloepoxy compounds, polyaldehydes, polyamines, and polyvalent metal salts. However, many of the crosslinking agents having often been used since the past have problems in the safety and the skin irritativity (e.g. polyglycidyl ethers). If it is taken into consideration that the surface-treated water-absorbent resin is used for the sanitary materials (e.g. diapers), then cases where such crosslinking agents remain on surfaces of the water-absorbent resin are much problematic in aspects such as safety. On the other hand, among the crosslinking agents having often been used since the past, there are also crosslinking agents which are less problematic in aspects such as safety (e.g. polyhydric alcohols). However, in cases where such crosslinking agents are used, their reactivity is so low that their reaction temperatures need to be made high (as the case may be, their reaction times need to be made long). In cases where the reaction temperatures are made high, there have been problems that much energy is needed because operations of raising and dropping the temperatures are also needed.

As surface treatment processes which can solve the above problems in the safety and the skin irritativity while the properties which the water-absorbent resin is desired to have are still kept on levels as high as possible, there are reported processes in which treating liquids containing the same monomers and crosslinking agents as monomers and crosslinking agents having been used for production of base polymers are used for surface treatment of the base polymers (e.g. refer to patent document 2 below).

However, problems have remained in that much energy is needed because the reaction temperatures for the surface treatment are still high.

[Patent Document 1]
  JP-A-044627/1982 (Kokai)
[Patent Document 2]
  Japanese Patent No. 2530668

SUMMARY OF THE INVENTION

A. Object of the Invention

An object of the present invention is to provide an excellent process for production of a surface-treated particulate water-absorbent resin wherein the process adopts a surface-treatment process that can enhance the properties (e.g. absorption capacity, absorption rate, gel strength, and suction force) (which the water-absorbent resin is desired to have) to extremely high levels, and also can solve the prior problems in the safety and the skin irritativity, and further can sufficiently carry out the treatment even at a reaction temperature near room temperature.

B. Disclosure of the Invention

The present inventors diligently studied to solve the above problems. As a result, the present inventors led to a concept that: a treating liquid containing a radically polymerizable compound is used as the treating liquid for the surface treatment and added to a particulate water-absorbent resin as the base polymer, and then the particulate water-absorbent resin is irradiated with active energy rays (e.g. ultraviolet rays, electron beams), thereby surface-treating it.

However, when the present inventors irradiated the particulate water-absorbent resin with the active energy rays to thereby surface-treat it, then, as the conditions may be, there occurred problems that it was impossible to achieve surface treatment of uniformity and of high crosslinking density throughout the entire surfaces of the water-absorbent resin.

Thus, the present inventors further studied diligently. As a result, the present inventors have found out that, if, when the particulate water-absorbent resin is irradiated with the active energy rays to thereby surface-treat it, the particulate water-absorbent resin being irradiated is put in a fluidized state, then it is possible to achieve the surface treatment of uniformity and of high crosslinking density throughout the entire surfaces of the water-absorbent resin.

The present invention has been completed in this way.

That is to say, a process according to the present invention for production of a surface-treated particulate water-absorbent resin is characterized by comprising the steps of: adding a treating liquid to a particulate water-absorbent resin as a base polymer, wherein the treating liquid contains a radically polymerizable compound; and then irradiating the particulate water-absorbent resin with active energy rays while fluidizing the particulate water-absorbent resin, thereby surface-treating it.

C. Effects of the Invention

In the present invention, when the surface treatment of the water-absorbent resin is carried out, the prior problems in the safety and the skin irritativity can be solved, and also the surface treatment can sufficiently be carried out even at a reaction temperature near room temperature, and further the resultant surface-treated particulate water-absorbent resin is on extremely high levels of the properties (e.g. absorption capacity, absorption rate, gel strength, and suction force) (which the water-absorbent resin is desired to have). In addition, as to the resultant surface-treated particulate water-absorbent resin, even if it absorbs water, it becomes fluid stable aggregates (FSA) (e.g. such as disclosed in JP-A-506263/1993 (Kohyo)) to thus little cause gel blocking. Furthermore, in the present invention, there is obtained a great effect of agglomerating a fine powder generated during the production of the water-absorbent resin.

These and other objects and the advantages of the present invention will be more fully apparent from the following detailed disclosure.

DETAILED DESCRIPTION OF THE INVENTION

Hereinafter, detailed descriptions are given about the process according to the present invention for production of a surface-treated particulate water-absorbent resin. However, the scope of the present invention is not bound to these descriptions. And other than the following illustrations can also be carried out in the form of appropriate modifications of the following illustrations within the scope not departing from the spirit of the present invention.

[Base Polymer]:

In the present invention, the particulate water-absorbent resin of which the surface treatment is to be carried out is referred to as base polymer.

The base polymer is a water-swellable crosslinked polymer obtained by a process including the step of introducing a crosslinked structure into a polymer. Its water swellability refers to the ability to absorb a physiological saline solution in a large amount of essentially not smaller than 3 times, favorably in the range of 5 to 200 times, more favorably 20 to 100 times, of the own weight without load.

The base polymer, usable in the present invention, is free of especial limitation if it is a polymer obtained by a process including the step of polymerizing a monomer component including a radically polymerizable water-soluble ethylenically unsaturated monomer as an essential component by such as prior publicly known methods.

The water-soluble ethylenically unsaturated monomer, which is used to produce the base polymer, is not especially limited. Examples thereof include: anionic monomers (e.g. (meth)acrylic acid, 2-(meth)acryloylethanesulfonic acid, 2-(meth)acryloylpropanesulfonic acid, 2-(meth)acrylamido-2-methylpropanesulfonic acid, vinylsulfonic acid, styrenesulfonic acid) and their salts; nonionic-hydrophilic-group-containing monomers (e.g. (meth)acrylamide, N-substituted (meth)acrylamide, 2-hydroxyethyl (meth)acrylate, 2-hydroxypropyl (meth)acrylate); and amino-group-containing unsaturated monomers (e.g. N,N-dimethyl aminoethyl (meth)acrylate, N,N-diethylaminoethyl (meth)acrylate, N,N-diethylaminopropyl (meth)acrylate, N,N-dimethylaminopropyl(meth)acrylamide) and their quaternized products. At least one monomer selected from among these monomers is usable. Favorable ones are (meth)acrylic acid, 2-(meth) acryloylethanesulfonic acid, 2-(meth)acrylamido-2-methylpropanesulfonic acid, their salts, N,N-dimethylaminoethyl (meth)acrylate, its quaternized products, and (meth)acrylamide. Particularly favorable ones are acrylic acid and/or its salts.

When the salt of acrylic acid is used as the water-soluble ethylenically unsaturated monomer, what are favorable from the viewpoint of physical properties are monovalent salts, selected from among alkaline-metal salts, ammonium salts, and amine salts, of acrylic acid, more favorably, alkaline-metal salts of acrylic acid, still more favorably, salts, selected from among sodium salts, lithium salts, and potassium salts, of acrylic acid.

When the base polymer is produced, there may further be used (within the range not spoiling the effects of the present invention) monomer components other than the water-soluble ethylenically unsaturated monomer, for example, hydrophobic monomers such as aromatic ethylenically unsaturated monomers having 8 to 30 carbon atoms, aliphatic ethylenically unsaturated monomers having 2 to 20 carbon atoms, alicyclic ethylenically unsaturated monomers having 5 to 15 carbon atoms, and (meth)acrylic acid alkyl esters (of which the alkyl groups have 4 to 50 carbon atoms). However, the concentration of the water-soluble ethylenically unsaturated monomer in the entire monomer components is favorably not less than 80 mass %, more favorably not less than 90 mass %, still more favorably not less than 95 mass %, particularly favorably 100 mass %.

The monomer component, used in producing the base polymer, is used favorably in the form of an aqueous solution. The concentration of the monomer component in this aqueous solution is selectable over the wide range, but is favorably not less than 25 mass %, more favorably not less than 35 mass %.

The base polymer is favorably an internally crosslinked one. As to the base polymer, those which are obtained by use of crosslinking agents (having at least two polymerizable unsaturated groups and/or at least two reactive functional groups per molecule) in the minimum amount necessary within the range for the gel strength of the base polymers to attain the desired standard are more desirable than self-crosslinked type base polymers which are obtained without using any crosslinking agent.

These crosslinking agents are not especially limited. Examples thereof include N,N'-methylenebis(meth)acrylamide, N-methylol(meth)acrylamide, glycidyl (meth)acrylate, (poly)ethylene glycol di(meth)acrylate, (poly)propylene glycol di(meth)acrylate, glycerol tri(meth)acrylate, glycerol acrylate methacrylate, polyvalent-metal salts of (meth)acrylic acid, trimethylolpropane tri(meth)acrylate, triallylamine, triallyl cyanurate, triallyl isocyanurate, triallyl phosphate, ethylene glycol diglycidyl ether, (poly)glycerol glycidyl ether, and polyethylene glycol diglycidyl ether. These crosslinking agents may be used in combinations with each other.

The amount of these crosslinking agents being used is favorably in the range of 0.0001 to 1 mol %, more favorably 0.001 to 0.5 mol %, still more favorably 0.005 to 0.1 mol %, relative to the monomer component used in producing the base polymer.

For obtaining the base polymer, it will do to carry out a process including the step of polymerizing the monomer component (including the aforementioned water-soluble ethylenically unsaturated monomer as an essential component) with a water-soluble radical polymerization initiator.

Although not especially limited, examples of the water-soluble radical polymerization initiator, which is usable, include: persulfates (e.g. potassium persulfate, sodium persulfate, ammonium persulfate); hydroperoxides (e.g. hydrogen peroxide, t-butyl hydroperoxide, cumene hydroperoxide); and azo compounds (e.g. 2,2'-azobis-2-amidinopropane dihydrochloride). Furthermore, these water-soluble radical polymerization initiators may be used in combination with reducing agents (e.g. sulfites, ferric L-ascorbate) to thus use them as redox system initiators.

The polymerization method is not especially limited. It is possible to adopt well-known methods, for example, such as aqueous solution polymerization, reversed-phase suspension polymerization, precipitation polymerization, and bulk polymerization. Of these polymerization methods, a method in which the monomer is polymerized in the form of an aqueous solution, namely, the aqueous solution polymerization or the reversed-phase suspension polymerization, is, in the present invention, favorable from the viewpoints of: the easiness of the polymerization reaction control; and the performances of the resultant water-absorbent resin.

A hydrogel polymer, obtained by the polymerization, is, favorably, dried and then pulverized to thereby form it into the particulate water-absorbent resin as the base polymer.

The aforementioned drying is, for example, carried out favorably in the range of 100 to 220° C., more favorably 120 to 200° C., with a drier such as hot-air drier.

As pulverizers usable for the aforementioned pulverization, for example, there can favorably be used those which are classified as shearing primary crushers, impact crushers, and high-speed-rotary type pulverizers among type names of pulverizers classified in Table 1.10 of *Powder Engineering Handbook* (edited by the Powder Engineering Society, first edition), and have at least one mechanism of pulverization mechanisms such as cutting, shearing, impact, and friction. Of the pulverizers corresponding to those machine types, pulverizers having the cutting and shearing mechanisms as main mechanisms are particularly favorably usable. For example, roll mill (roll-rotary type) pulverizers are favorably cited.

The resultant particulate water-absorbent resin, as the base polymer, may be used for the surface treatment as it is. Favorably used are, however, resins having been classified so that particles having particle diameters of not larger than 850 μm would be included in an amount of not smaller than 70 mass %, more favorably not smaller than 80 mass %, still more favorably not smaller than 90 mass %, particularly favorably not smaller than 98 mass %, most favorably substantially 100 mass %, of the entirety.

In addition, in the production process according to the present invention, there is obtained a great effect of agglomerating a fine powder generated during the production of the water-absorbent resin. Therefore, even if the fine powder is contained in the particulate water-absorbent resin as the base polymer, it is not greatly problematic. However, the particulate water-absorbent resin, as the base polymer, is favorably such as has been classified so that particles having particle diameters of larger than 100 μm would be included in an amount of not smaller than 70 mass %, more favorably not smaller than 80 mass %, still more favorably not smaller than 90 mass %, particularly favorably not smaller than 98 mass %, most favorably substantially 100 mass %, of the entirety.

[Surface Treatment]:

In the production process according to the present invention, a treating liquid is added to the particulate water-absorbent resin as the base polymer (wherein the treating liquid contains a radically polymerizable compound), and then the particulate water-absorbent resin is irradiated with active energy rays while being fluidized, thereby being surface-treated.

Examples of the active energy rays include ultraviolet rays, electron beams, infrared rays, and radiations. However, favorable ones are the ultraviolet rays and the electron beams.

When the ultraviolet rays are used as the active energy rays, a polymerization initiator is favorably contained in the treating liquid. Examples of the polymerization initiator, which is contained in the treating liquid, include photoinitiators such as benzoin derivatives, benzyl derivatives, acetophenone derivatives, benzophenone derivatives, and azo compounds. In addition, they may be used jointly with thermal initiators such as persulfates (e.g. sodium persulfate, potassium persulfate, ammonium persulfate); hydroperoxides (e.g. hydrogen peroxide, t-butyl hydroperoxide, cumene hydroperoxide); and azo compounds (e.g. azonitrile compounds, azoamidine compounds, cyclic azoamidine compounds, azoamide compounds, alkylazo compounds, 2,2'-azobis-2-amidinopropane dihydrochloride). Furthermore, these polymerization initiators may be used in combination with reducing agents (e.g. sulfites, L-ascorbic acid (salts)).

The treating liquid, used in the production process according to the present invention, contains the radically polymerizable compound so that a water-absorbent resin layer having a crosslinking density higher than the base polymer can be formed in surface-neighboring portions of the water-absorbent resin particles by the irradiation of the active energy rays.

Examples of the radically polymerizable compound, usable in the present invention, include: compounds having at least two polymerizable unsaturated groups and/or at least two reactive functional groups per molecule (e.g. the crosslinking agents usable for the production of the particulate water-absorbent resin as the base polymer); and the water-soluble ethylenically unsaturated monomers usable for the production of the particulate water-absorbent resin as the base polymer.

The treating liquid, used in the production process according to the present invention, favorably contains the compound having at least two polymerizable unsaturated groups and/or at least two reactive functional groups per molecule. Examples of the compound having at least two polymerizable unsaturated groups and/or at least two reactive functional groups per molecule include those which are herein previously cited as examples of the aforementioned crosslinking agents that are used for the production of the base polymer.

The treating liquid, used in the production process according to the present invention, favorably contains: at least one material selected from among those which are herein previously cited as examples of the water-soluble ethylenically unsaturated monomers that are used for the production of the particulate water-absorbent resin as the base polymer; and/or at least one material selected from among those which are herein previously cited as examples of the crosslinking agents that are used for the production of the particulate water-absorbent resin as the base polymer. By using such a treating liquid, the prior problems in the safety and the skin irritativity are solved.

The treating liquid, used in the production process according to the present invention, more favorably contains: at least one material selected from among the water-soluble ethylenically unsaturated monomers having been used for the production of the particulate water-absorbent resin as the base polymer; and/or at least one material selected from among the crosslinking agents having been used for the production of the particulate water-absorbent resin as the base polymer. If the same monomers as the water-soluble ethylenically unsaturated monomers having been used for the production of the particulate water-absorbent resin as the base polymer, and/or the same crosslinking agents as the crosslinking agents having been used for the production of the particulate water-absorbent resin as the base polymer, are used for the surface treatment in this way, then a surface-treated layer having the same component composition as of the base polymer is formed, so there is an advantage that it is possible to make high-safety surface treatment.

As to the amount of the radically polymerizable compound (contained in the treating liquid) being used, this compound is favorably used in a ratio of 1 to 9 mass %, more favorably 1 to 6 mass %, still more favorably 2 to 5 mass %, relative to the solid component content of the particulate water-absorbent resin as the base polymer. In the case where the amount of the radically polymerizable compound (contained in the treating liquid) being used deviates from the above range, there is a possibility that the effects of the present invention cannot sufficiently be exercised.

The treating liquid, used in the production process according to the present invention, is favorably used in a state containing water. The concentration of water in the aforementioned treating liquid is selectable over the wide range, but is favorably not less than 20 mass %, more favorably not less than 40 mass %.

When the treating liquid, which contains: at least one material selected from among the water-soluble ethylenically unsaturated monomers having been used for the production of the particulate water-absorbent resin as the base polymer; and at least one material selected from among the crosslinking agents having been used for the production of the particulate water-absorbent resin as the base polymer; is used as the treating liquid used in the production process according to the present invention, then the total amount (being used) of the at least one material selected from among the crosslinking agents having been used for the production of the particulate water-absorbent resin as the base polymer is favorably in the range of 0.05 to 20 mol %, more favorably 0.1 to 10 mol %, still more favorably 0.5 to 5 mol %, relative to the total amount (being used) of the at least one material selected from among the water-soluble ethylenically unsaturated monomers having been used for the production of the particulate water-absorbent resin as the base polymer. That is to say, the at least one material selected from among the crosslinking agents having been used for the production of the particulate water-absorbent resin as the base polymer is used in an amount larger than the amount of the crosslinking agent being used relative to the monomer component.

In the treating liquid, there may further be contained: at least one surfactant selected from the group consisting of nonionic surfactants of not less than 7 in HLB and anionic surfactants; or a water-soluble polymer; in order to appropriately control the degree of the surface treatment.

Examples of the above surfactants include sorbitan fatty acid esters, polyoxyethylene sorbitan fatty acid esters, polyglycerol fatty acid esters, polyoxyethylene alkyl ethers, polyoxyethylene alkyl phenol ethers, polyoxyethylene acyl esters, sucrose fatty acid esters, higher alcohol sulfuric acid ester salts, alkylnaphthalenesulfonic acid salts, alkyl polyoxyethylene sulfate salts, and dialkylsulfosuccinic acid salts. Examples of the above water-soluble polymer include poly-vinyl alcohol, poly(ethylene oxide), polyethylene glycol, polypropylene glycol, polyacrylamide, poly(acrylic acid), sodium polyacrylate, polyethylenimine, methyl cellulose, carboxymethyl cellulose, hydroxyethyl cellulose, hydroxypropyl cellulose, dextrin, and sodium alginate. When these surfactants and water-soluble polymers are used, they are favorably used in an amount of 0.01 to 30 mass %, more favorably 0.1 to 10 mass %, relative to the entire treating liquid.

In the treating liquid used in the production process according to the present invention, there may further be contained other components such as hydrophilic organic solvents within the range not spoiling the effects of the present invention. Examples of the hydrophilic organic solvents include: alcohols (e.g. methyl alcohol, ethyl alcohol, propyl alcohol, isopropyl alcohol, butyl alcohol, isobutyl alcohol, t-butyl alcohol); ketones (e.g. acetone, methyl ethyl ketone); ethers (e.g. dioxane, alkoxy(poly)ethylene glycol, tetrahydrofuran); amides (e.g. ε-caprolactam, N,N-dimethylformamide); sulfoxides (e.g. dimethyl sulfoxide); and polyhydric alcohols (e.g. ethylene glycol, diethylene glycol, propylene glycol, triethylene glycol, tetraethylene glycol, 1,3-propanediol, dipropylene glycol, 2,2,4-trimethyl-1,3-pentanediol, glycerol, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, pentaerythritol, sorbitol). These may be used either alone respectively or in combinations with each other.

In the production process according to the present invention, the treating liquid having been obtained in the above way is added to the particulate water-absorbent resin as the base polymer to mix them together.

Although not especially limited, examples of methods for the above mixing include methods in which conventional mixers, for example, such as V type mixers, ribbon type mixers, screw type mixers, rotary disk type mixers, gas flow type mixers, batch type kneaders, continuous type kneaders, and paddle type mixers, are used to mix the particulate water-absorbent resin as the base polymer with the treating liquid.

Although not especially limited, the temperature at which the above addition is carried out is favorably in the range of 0 to 120° C., more favorably 0 to 60° C., still more favorably 10 to 40° C.

In the production process according to the present invention, after the addition of the treating liquid to the particulate water-absorbent resin as the base polymer, this resin is irradiated with the active energy rays to thereby surface-treat it. However, it is important that, during this irradiation, the particulate water-absorbent resin is fluidized. If the particulate water-absorbent resin is surface-treated by being irradiated with the active energy rays while being fluidized in this way, then it is possible to achieve the surface treatment which is uniform and high in crosslinking density throughout the entire surfaces of the water-absorbent resin. In the case where the resin is irradiated with the active energy rays either in a state where its fluidization is insufficient (e.g. case where the resin is mildly stirred) or without the fluidization, it is impossible to achieve the surface treatment which is uniform and high in crosslinking density throughout the entire surfaces of the water-absorbent resin.

Examples of methods for fluidizing the particulate water-absorbent resin during the irradiation of the active energy rays include methods in which there are used such as vibration type mixers, vibration feeders, ribbon type mixers, conical ribbon type mixers, screw type mixing extruders, gas flow type mixers, batch type kneaders, continuous type kneaders, paddle type mixers, high-speed-fluidizing type mixers, and float-fluidizing type mixers.

As to conditions of irradiating the active energy rays, conventional common irradiation conditions are applicable thereto. However, for example, when the ultraviolet rays are used, favorably, the irradiation intensity is in the range of 3 to 1,000 mW/cm$^2$, and the exposure dose is in the range of 100 to 10,000 mJ/cm$^2$. When the electron beams are used, favorably, the acceleration voltage is in the range of 50 to 800 kV, and the absorbed dose is in the range of 0.1 to 100 Mrad.

When the active energy rays are irradiated to thereby carry out the surface treatment, its treatment temperature can be set for lower than prior surface treatment temperature, favorably lower than 60° C., more favorably in the range of 0 to 55° C., still more favorably 5 to 50° C., particularly favorably 10 to 40° C.

In addition, for the purpose of such as drying, the particulate water-absorbent resin may be heat-treated in the temperature range of 50 to 250° C. after having been irradiated with the active energy rays, if necessary.

In the production process according to the present invention, there is obtained a great effect of agglomerating a fine powder generated during the production of the water-absorbent resin. That is to say, even if the fine powder is contained in the particulate water-absorbent resin as the base polymer, the fine powder is agglomerated by applying the production process according to the present invention, so that the fine powder content of the resultant surface-treated particulate water-absorbent resin can extremely be reduced.

[Surface-Treated Particulate Water-Absorbent Resin]:

The surface-treated particulate water-absorbent resin obtained by the production process according to the present invention is a product having successfully achieved the surface treatment which is uniform and high in crosslinking density throughout the entire surfaces of the water-absorbent resin. Therefore, this resin is a product having successfully enhanced its properties (e.g. absorption capacity, absorption rate, gel strength, and suction force) (which the water-absorbent resin is desired to have) to extremely high levels.

As to the surface-treated particulate water-absorbent resin obtained by the production process according to the present invention, its free-swelling capacity (GV) is favorably not less than 20 g/g, more favorably not less than 22 g/g, still more favorably not less than 24 g/g, particularly favorably not less than 26 g/g.

As to the surface-treated particulate water-absorbent resin obtained by the production process according to the present invention, its absorption capacity under load (AAP) is favorably not less than 10 g/g, more favorably not less than 12 g/g, still more favorably not less than 14 g/g, yet still more favorably not less than 15 g/g, yet still more favorably not less than 17 g/g, particularly favorably not less than 20 g/g, under a load of 4.9 kPa.

As to the surface-treated particulate water-absorbent resin obtained by the production process according to the present invention, because there is obtained a great effect of agglomerating a fine powder generated during the production of the water-absorbent resin, the particle diameter distribution of this surface-treated particulate water-absorbent resin is shifted toward the larger particle diameter side than before the surface treatment. The ratio of this shift varies with such as: the kind and amount of the treating liquid; and further, when the treating liquid is used in the form of an aqueous solution, the ratio of water; the irradiation conditions of the active energy rays; and how to make the fluidization during the irradiation.

As to the surface-treated particulate water-absorbent resin obtained by the production process according to the present invention, even if it absorbs water, it becomes fluid stable aggregates (FSA) to thus little cause gel blocking.

DETAILED DESCRIPTION OF THE PREFERRED EMBODIMENTS

Hereinafter, the present invention is more specifically illustrated by the following Examples of some preferred embodiments in comparison with Comparative Examples not according to the present invention. However, the present invention is not limited to them. Hereinafter, for convenience, the units "mass part(s)" and "liter(s)" may be referred to simply as "part(s)" and "L" respectively. In addition, the unit "mass %" may be referred to as "wt %".

The measurement and evaluation methods in the Examples and the Comparative Examples are shown below.

<Free-Swelling Capacity (GV)>:

An amount of 0.2 g of water-absorbent resin was uniformly placed into a nonwoven-fabric-made bag (60 mm×60 mm) and then immersed into a large excess (usually, 500 mL) of 0.9 mass % aqueous sodium chloride solution (physiological saline solution) at room temperature (25±2° C.). After 30 minutes, the bag was pulled up and then drained of water at 250 G with a centrifugal separator for 3 minutes, and then the mass W1 (g) of the bag was measured. In addition, the same procedure as the above was carried out without the water-absorbent resin, and the resultant mass W2 (g) of the bag was measured. Then, the free-swelling capacity (GV) (g/g) was calculated from these W1 and W2 in accordance with the following equation:

$GV$ (g/g)=[$W1$ (g)–$W2$ (g)–mass (g) of water-absorbent resin]/mass (g) of water-absorbent resin <Absorption Capacity Under Load (AAP)>:

A stainless metal gauze, which was a screen of 400 meshes (mesh opening size: 38 μm), was attached by fusion to a bottom of a plastic supporting cylinder having an inner diameter of 60 mm. Then, under conditions of a room temperature (25±2° C.) and a humidity of 50 RH %, onto the above metal gauze, there was uniformly spread 0.9 g of particulate water-absorbent resin, and further thereon, there were mounted a piston and a load in sequence, wherein the piston had an outer diameter of only a little smaller than 60 mm and made no gap with the inner wall surface of the supporting cylinder, but was not hindered from moving up and down, and wherein the piston and the load were adjusted so that a load of 4.9 kPa could uniformly be applied to the particulate water-absorbent resin. Then, the mass Wa (g) of the resultant one set of measurement apparatus was measured.

A glass filter plate having a diameter of 90 mm (produced by Sogo Rikagaku Glass Seisakusho Co., Ltd., pore diameter: 100 to 120 μm) was mounted inside a Petri dish having a diameter of 150 mm, and then a 0.9 mass % aqueous sodium chloride solution (physiological saline solution) (20 to 25° C.) was added up to the same level as the top surface of the glass filter plate, on which a filter paper having a diameter of 90 mm (produced by ADVANTEC Toyo Co., Ltd., trade name: (JIS P 3801, No. 2), thickness: 0.26 mm, diameter of captured particles: 5 μm) was then mounted so that its entire surface would be wetted, and further, an excess of liquid was removed.

The one set of measurement apparatus was mounted on the above wet filter paper, thereby getting the liquid absorbed under the load for a predetermined duration. This absorption duration was defined as 1 hour from the start of the measurement. Specifically, 1 hour later, the one set of measurement apparatus was removed by being lifted to measure its mass Wb (g). This measurement of the mass must be carried out as quickly as possible and in a manner not to give any vibration. Then, the absorption capacity under load (AAP) (g/g) was calculated from the Wa and Wb in accordance with the following equation:

AAP (g/g)=[Wb (g)−Wa (g)]/mass (g) of particulate water-absorbent resin

<Stability of Surface-Treated Product During Water Absorption>:

Comparatively large particles (aggregates) were taken from the surface-treated product and then put under an optical microscope (MICROFLEX UFX-II of Nikon), its enlargement magnification being set for 20 magnifications. Next, water was added to the aggregates to observe whether the aggregates separated into their component particles in the swelling process or not. Furthermore, if necessary, a needle was used to try separating the aggregates into their component particles, whereby the easiness of the separation was examined.

<Particle Diameter Distribution>:

An amount of 10 g of surface-untreated or surface-treated water-absorbent resin was classified with testing sieves having a diameter of 75 mm and mesh opening sizes of 850 μm, 600 μm, and 300 μm (produced by Iida Seisakusho K. K.). Then, the mass of each classified fraction was measured to determine mass % of each particle diameter range. The sieve classification was carried out by carrying out shaking with SIEVE SHAKER, ES-65 type (produced by Iida Seisakusho K. K.) for 5 minutes.

PRODUCTION EXAMPLE 1

An aqueous acrylic acid salt type monomer solution (monomer concentration: 38 wt %, neutralization degree: 75 mol %), including sodium acrylate, acrylic acid, and water, was prepared in a kneader having two sigma-type blades. Then, into this aqueous solution, there was dissolved polyethylene glycol diacrylate (molar-number degree of addition polymerization: n=8) as an internal-crosslinking agent in an amount of 0.05 mol % relative to the aforementioned monomers.

Next, nitrogen gas was made to blow into the resultant aqueous solution, thereby decreasing its oxygen concentration and displacing the entire gas inside the reactor with nitrogen. Subsequently, while the two sigma-type blades were revolved, sodium persulfate and L-ascorbic acid were added as polymerization initiators in amounts of 0.05 mol % and 0.0006 mol % respectively (relative to the monomers) to carry out stirring polymerization in the kneader. As a result, 40 minutes later, a hydrogel polymer having an average particle diameter of 2 mm was obtained.

The resultant hydrogel polymer was dried in a hot-air drier (having been set for 170° C.) for 45 minutes. Thereafter, the resultant dried material was pulverized with a roll mill pulverizer and then classified with a sieve of 850 μm in mesh opening size to thereby remove particles larger than 850 μm in particle diameter, thus obtaining a particulate water-absorbent resin (A) as the base polymer.

The results of the various evaluations of the resultant particulate water-absorbent resin (A) as the base polymer are shown in Table 1.

In addition, the particle diameter distribution of the resultant particulate water-absorbent resin (A) as the base polymer is shown in Table 2.

EXAMPLE 1

A treating liquid (having been prepared by beforehand mixing 0.20 g of polyethylene glycol diacrylate (molar-number degree of addition polymerization: n=8), 2.6 g of sodium acrylate, 0.8 g of acrylic acid, 5.4 g of water, 0.005 g of sodium persulfate, and 0.036 g of Irgacure 184 (produced by Chiba Specialty Chemicals) together) was added to 100 g of the particulate water-absorbent resin (A) as the base polymer (having been obtained from Production Example 1) to mix them together.

Next, 10 g of the resultant mixture was set in Minishaker (produced by IKA Works, Inc., MS1S1). Then, while being stirred by shaking at 600 rpm, this mixture was irradiated with UV of 4 mW/cm$^2$ in irradiation intensity at room temperature with an ultraviolet irradiation device (produced by Toshiba, TOSCUR 401) for 20 minutes, thus obtaining a surface-treated particulate water-absorbent resin (1).

The results of the various evaluations of the resultant surface-treated particulate water-absorbent resin (1) are shown in Table 1.

EXAMPLE 2

A surface-treated particulate water-absorbent resin (2) was obtained in the same way as of Example 1 except that a treating liquid (having been prepared by beforehand mixing 1.0 g of polyethylene glycol diacrylate (molar-number degree of addition polymerization: n=8), 2.6 g of sodium acrylate, 0.8 g of acrylic acid, 4.6 g of water, 0.007 g of sodium persulfate, and 0.044 g of Irgacure 184 together) was used.

The results of the various evaluations of the resultant surface-treated particulate water-absorbent resin (2) are shown in Table 1.

EXAMPLE 3

A surface-treated particulate water-absorbent resin (3) was obtained in the same way as of Example 1 except that a treating liquid (having been prepared by beforehand mixing 0.20 g of polyethylene glycol diacrylate (molar-number degree of addition polymerization: n=8), 2.6 g of sodium acrylate, 0.8 g of acrylic acid, 5.4 g of water, 0.005 g of sodium persulfate, and 0.036 g of Irgacure 2959 together) was used.

The results of the various evaluations of the resultant surface-treated particulate water-absorbent resin (3) are shown in Table 1.

In addition, the particle diameter distribution of the resultant surface-treated particulate water-absorbent resin (3) is shown in Table 2.

EXAMPLE 4

A surface-treated particulate water-absorbent resin (4) was obtained in the same way as of Example 1 except that a treating liquid (having been prepared by beforehand mixing 0.20 g of trimethylolpropane triacrylate, 2.6 g of sodium acrylate, 0.8 g of acrylic acid, 5.4 g of water, 0.005 g of sodium persulfate, and 0.036 g of Irgacure 184 together) was used.

The results of the various evaluations of the resultant surface-treated particulate water-absorbent resin (4) are shown in Table 1.

EXAMPLE 5

A surface-treated particulate water-absorbent resin (5) was obtained in the same way as of Example 1 except that a treating liquid (having been prepared by beforehand mixing 1.0 g of trimethylolpropane triacrylate, 2.6 g of sodium acrylate, 0.8 g of acrylic acid, 4.6 g of water, 0.007 g of sodium persulfate, and 0.044 g of Irgacure 184 together) was used.

The results of the various evaluations of the resultant surface-treated particulate water-absorbent resin (5) are shown in Table 1.

EXAMPLE 6

A surface-treated particulate water-absorbent resin (6) was obtained in the same way as of Example 1 except that a treating liquid (having been prepared by beforehand mixing 1.2 g of trimethylolpropane triacrylate, 3.9 g of acrylic acid, 3.9 g of water, 0.008 g of sodium persulfate, and 0.051 g of Irgacure 184 together) was used.

The results of the various evaluations of the resultant surface-treated particulate water-absorbent resin (6) are shown in Table 1.

EXAMPLE 7

An amount of 500 g of the particulate water-absorbent resin (A) as the base polymer (having been obtained from Production Example 1) was placed into a batch type kneader of 2 L in capacity as equipped with two sigma-type blades. Then, while the water-absorbent resin was stirred at a number of revolutions of the blades of 73 rpm, thereto a treating liquid (having been prepared by beforehand mixing 1.0 g of polyethylene glycol diacrylate (molar-number degree of addition polymerization: n=9), 10.0 g of sodium acrylate, 4.0 g of acrylic acid, 30 g of water, 0.0225 g of sodium persulfate, and 0.15 g of Irgacure 2959 together) was dropped to mix them together.

Subsequently, on the above batch type kneader, there was put an ultraviolet irradiation device (produced by Ushio Denki K. K., Lamp House UVH-1500M, power source section: VB-1501BY, metal halide lamp of 125 mm in luminous length). Then, while being stirred at a number of revolutions of the blades of 73 rpm, the water-absorbent resin was irradiated with UV of 65 mW/cm$^2$ in irradiation intensity at room temperature for 10 minutes, thus obtaining a surface-treated particulate water-absorbent resin (7).

The results of the various evaluations of the resultant surface-treated particulate water-absorbent resin (7) are shown in Table 1.

EXAMPLE 8

A surface-treated particulate water-absorbent resin (8) was obtained in the same way as of Example 7 except that a treating liquid (having been prepared by beforehand mixing 1.0 g of polyethylene glycol diacrylate (molar-number degree of addition polymerization: n=9), 10.0 g of sodium acrylate, 4.0 g of acrylic acid, 45 g of water, 0.0225 g of sodium persulfate, and 0.15 g of Irgacure 2959 together) was used.

The results of the various evaluations of the resultant surface-treated particulate water-absorbent resin (8) are shown in Table 1.

EXAMPLE 9

An amount of 1,000 g of the particulate water-absorbent resin (A) as the base polymer (having been obtained from Production Example 1) was placed into Lödige Mixer (produced by Matsubo K. K., type: M20). Then, while the water-absorbent resin was stirred at a number of revolutions of the mixer of 140 rpm and a number of revolutions of the chopper of 500 rpm, thereto a treating liquid (having been prepared by beforehand mixing 2.0 g of polyethylene glycol diacrylate (molar-number degree of addition polymerization: n=9), 20.0 g of sodium acrylate, 8.0 g of acrylic acid, 90 g of water, 0.045 g of sodium persulfate, and 0.3 g of Irgacure 2959 together) was spraywise supplied to mix them together.

Subsequently, on the above Lödige Mixer, there was put the same ultraviolet irradiation device as used in Example 7. Then, while being stirred at a number of revolutions of the mixer of 180 rpm and a number of revolutions of the chopper of 500 rpm, the water-absorbent resin was irradiated with UV of 42 mW/cm$^2$ in irradiation intensity at room temperature for 5 minutes, thus obtaining a surface-treated particulate water-absorbent resin (9).

The results of the various evaluations of the resultant surface-treated particulate water-absorbent resin (9) are shown in Table 1.

In addition, the particle diameter distribution of the resultant surface-treated particulate water-absorbent resin (9) is shown in Table 2.

EXAMPLE 10

A surface-treated particulate water-absorbent resin (10) was obtained in the same way as of Example 9 except that a treating liquid (having been prepared by beforehand mixing 2.0 g of polyethylene glycol diacrylate (molar-number degree of addition polymerization: n=4), 20.0 g of sodium acrylate, 8.0 g of acrylic acid, 90 g of water, 0.045 g of sodium persulfate, and 0.30 g of Irgacure 2959 together) was used.

The results of the various evaluations of the resultant surface-treated particulate water-absorbent resin (10) are shown in Table 1.

EXAMPLE 11

A surface-treated particulate water-absorbent resin (11) was obtained in the same way as of Example 9 except that a treating liquid (having been prepared by beforehand mixing 0.8 g of 2-hydroxy-1-acryloxy-3-methacryloxypropane (produced by Shin-Nakamura Chemical Industrial Co., Ltd., 701A), 20.0 g of sodium acrylate, 8.0 g of acrylic acid, 90 g of water, 0.045 g of sodium persulfate, and 0.30 g of Irgacure 2959 together) was used.

The results of the various evaluations of the resultant surface-treated particulate water-absorbent resin (11) are shown in Table 1.

COMPARATIVE EXAMPLE 1

A treating liquid (having been prepared by beforehand mixing 0.32 g of 1,4-butanediol, 0.5 g of propylene glycol, and 2.73 g of water together) was added to 100 g of the particulate water-absorbent resin (A) as the base polymer (having been obtained from Production Example 1) to mix them together.

Next, 10 g of the resultant mixture was heat-treated at 212° C. for 20 minutes, thus obtaining a surface-treated particulate water-absorbent resin (c1).

The results of the various evaluations of the resultant surface-treated particulate water-absorbent resin (c1) are shown in Table 1.

COMPARATIVE EXAMPLE 2

An amount of 10 g of the particulate water-absorbent resin to which the treating liquid had been added to mix them together (which had been obtained in the same way as of Example 1) was spread onto a vat and then irradiated with UV under the same conditions as of Example 1 while being sometimes mixed by a spatula. As a result, non-uniform aggregates which contained agglomerates of not smaller than several millimeters in particle diameter were formed. These aggregates were passed in their entirety through a testing sieve of 1,000 μm in mesh opening size (produced by Iida Seisakusho K. K.), thus obtaining a surface-treated particulate water-absorbent resin (c2).

The results of the various evaluations of the resultant surface-treated particulate water-absorbent resin (c2) are shown in Table 1.

TABLE 2

|  | Production Example 1 Base polymer (A) (wt %) | Example 3 Particulate water-absorbent resin (3) (wt %) | Example 9 Particulate water-absorbent resin (9) (wt %) |
|---|---|---|---|
| 850 μm < | 0 | 42.8 | 1.9 |
| 600–850 μm | 24.1 | 49.5 | 31.3 |
| 300–600 μm | 54.6 | 7.7 | 60.0 |
| 300 μm > | 21.3 | 0 | 6.8 |

INDUSTRIAL APPLICATION

In the present invention, when the surface treatment of the water-absorbent resin is carried out, the prior problems in the safety and the skin irritativity can be solved, and also the surface treatment can sufficiently be carried out even at a reaction temperature near room temperature, and further the resultant surface-treated particulate water-absorbent resin is

TABLE 1

|  |  | Surface treatment conditions | | | | Stability of surface-treated product during |
|---|---|---|---|---|---|---|
|  |  | Temperature (° C.) | Time (minutes) | GV (g/g) | AAP (g/g) | water absorption |
| Production Example 1 | Base polymer (A) | — | — | 37.1 | 7.6 | — |
| Example 1 | Particulate water-absorbent resin (1) | Room temperature | 20 | 31.8 | 18.3 | ○ |
| Example 2 | Particulate water-absorbent resin (2) | Room temperature | 20 | 31.6 | 15.2 | ○ |
| Example 3 | Particulate water-absorbent resin (3) | Room temperature | 20 | 31.2 | 20.5 | ○ |
| Example 4 | Particulate water-absorbent resin (4) | Room temperature | 20 | 30.4 | 16.2 | ○ |
| Example 5 | Particulate water-absorbent resin (5) | Room temperature | 20 | 31.0 | 15.7 | ○ |
| Example 6 | Particulate water-absorbent resin (6) | Room temperature | 20 | 30.5 | 17.5 | ○ |
| Example 7 | Particulate water-absorbent resin (7) | Room temperature | 10 | 28.1 | 19.6 | ○ |
| Example 8 | Particulate water-absorbent resin (8) | Room temperature | 10 | 27.0 | 22.5 | ○ |
| Example 9 | Particulate water-absorbent resin (9) | Room temperature | 5 | 27.0 | 20.4 | ○ |
| Example 10 | Particulate water-absorbent resin (10) | Room temperature | 5 | 27.0 | 20.9 | ○ |
| Example 11 | Particulate water-absorbent resin (11) | Room temperature | 5 | 27.0 | 22.2 | ○ |
| Comparative Example 1 | Particulate water-absorbent resin (c1) | 212 | 20 | 34.6 | 14.2 | X |
| Comparative Example 2 | Particulate water-absorbent resin (c2) | Room temperature | 20 | 32.7 | 9.0 | X |

Stability of surface-treated product during water absorption:
○: Difficult to separate into particles
X: Easy to separate into particles on extremely high levels of the properties (e.g. absorption capacity, absorption rate, gel strength, and suction force) (which the water-absorbent resin is desired to have). In addition, as to the resultant surface-treated particulate water-absorbent resin, even if it absorbs water, it becomes fluid stable aggregates (FSA) to thus little cause gel blocking. Furthermore, in the present invention, there is obtained a great effect of agglomerating a fine powder generated during the production of the water-absorbent resin. Accordingly, the surface-treated particulate water-absorbent resin, obtained by the present invention, can be optimum also as a water-absorbent resin for sanitary napkins, disposable diapers, or other sanitary materials which absorb body fluids, and for agriculture.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for production of a surface-treated particulate water-absorbent resin, which comprises the steps of: adding a treating liquid to a particulate water-absorbent resin as a base polymer, wherein the treating liquid contains a radically polymerizable compound; and then irradiating the particulate water-absorbent resin with active energy rays while fluidizing the particulate water-absorbent resin, thereby surface-treating it.

2. A process according to claim 1 for production of a surface-treated particulate water-absorbent resin, wherein the treating liquid further contains a polymerization initiator.

3. A process according to claim 1 for production of a surface-treated particulate water-absorbent resin, wherein the treating liquid contains a compound having at least two polymerizable unsaturated groups and/or at least two reactive functional groups per molecule.

4. A process according to claim 1 for production of a surface-treated particulate water-absorbent resin, wherein the radically polymerizable compound is used in a ratio of 1 to 9 mass % relative to the solid component content of the particulate water-absorbent resin as the base polymer.

5. A process according to claim 1 for production of a surface-treated particulate water-absorbent resin, wherein the treating liquid contains: at least one material selected from among water-soluble ethylenically unsaturated monomers having been used for production of the particulate water-absorbent resin as the base polymer; and/or at least one material selected from among crosslinking agents having been used for production of the particulate water-absorbent resin as the base polymer.

6. A process according to claim 1 for production of a surface-treated particulate water-absorbent resin, wherein the surface-treated particulate water-absorbent resin exhibits an absorption capacity of not less than 10 g/g under a load of 4.9 kPa.

7. A process according to claim 1 for production of a surface-treated particulate water-absorbent resin, wherein the active energy rays are ultraviolet rays or electron beams.

8. A process according to claim 1 for production of a surface-treated particulate water-absorbent resin, wherein the active energy rays are ultraviolet rays wherein the irradiation intensity of the ultraviolet rays is in the range of 3 to 1,000 mW/cm$^2$.

9. A process according to claim 1 for production of a surface-treated particulate water-absorbent resin, wherein, when the surface treatment is carried out, its treatment temperature is lower than 60° C.

10. A process according to claim 1 for production of a surface-treated particulate water-absorbent resin, wherein the concentration of water in the treating liquid is not less than 20 mass %.

* * * * *